United States Patent [19]

James

[11] Patent Number: 4,969,067
[45] Date of Patent: Nov. 6, 1990

[54] BELLOWS BRAKE SWITCH FOR VEHICULAR SAFETY LIGHTS

[76] Inventor: Terry J. James, 11107 Arminta, #117, Sun Valley, Calif. 91352

[21] Appl. No.: 425,247

[22] Filed: Oct. 23, 1989

[51] Int. Cl.⁵ .......................... B60Q 1/00; H01H 3/14
[52] U.S. Cl. ...................................... 362/61; 362/802; 362/251; 200/61.89
[58] Field of Search .................. 362/61, 80, 80.1, 234, 362/251, 802, 800; 340/470, 472, 464; 200/61.89

[56] References Cited

U.S. PATENT DOCUMENTS

| | | | |
|---|---|---|---|
| 2,452,762 | 11/1948 | Karow | 200/61.89 |
| 2,800,545 | 7/1957 | Pellegrino | 200/61.89 |
| 3,300,604 | 1/1967 | Straub | 200/61.89 |
| 3,794,147 | 2/1974 | Shellhause | 200/61.89 |
| 4,591,954 | 5/1986 | Kawamura et al. | 362/61 |
| 4,680,678 | 7/1987 | Iwaki | 362/61 |

Primary Examiner—Stephen F. Husar
Assistant Examiner—D. M. Cox
Attorney, Agent, or Firm—Roger A. Marrs

[57] ABSTRACT

A tri-functional safety lamp is disclosed herein having a housing supporting at least three lamps operatively coupled to an electronic circuit incorporating a bellows switch. The switch includes a pair of contact members connected together and separated by a collapsible bellows wherein one member is secured to a movable brake cable while the member slides or floats on the cable. A stop element is fixedly carried on a stationary frame or support against which the floating contact member bears to collapse the bellows so that mating contacts on the members engage to close the electronic circuit.

2 Claims, 1 Drawing Sheet

BELLOWS BRAKE SWITCH FOR VEHICULAR SAFETY LIGHTS

BACKGROUND OF THE INVENTION

1. Field of the Invention

This invention relates to vehicle safety systems and more particularly to a novel brake lighting system which enhances vehicle visibility by employing super brilliant light-emitting diodes employing solid state technology, and which further includes a bellows type actuation switch for selectively energizing the lighting electrical circuit.

2. Brief Description of the Prior Art

In the past, it has been the conventional practice to employ a lighting system on vehicles which is energized by a hand or foot pedal via an electrical switch whereby lamp energization provides visual indication to persons behind the vehicle that the vehicle is braking. Some conventional systems have improved optical visibility by incorporating particular lens systems, or by increasing the number of lamps or the pattern of lamps. However, all previous systems employ a simple microswitch means for energizing the lamps upon actuation of the foot pedal or hand brake on the vehicle. Microswitch means generally include a leaf spring outwardly projecting in a cantilevered manner from a housing having a movable contact so that when the end of the leaf spring is moved, the contacts of the switch will engage to energize the circuit.

Although such a micro-switch has been successful in the past, difficulties and problems have been encountered which stem largely from the fact that there are openings in the housing which permit dirt or debris to enter and which prevent the switch contacts from closing when needed. Also, micro-switches rely upon spring tension to the extent that after the leaf spring has been fatigued, the spring action no longer properly biases the contacts in an open position.

Other problems and difficulties have been encountered, such as a lackluster visual display of light which is caused by low energization of the lamps or because the lamps are not properly housed so as to permit maximum radiation of light through reflective lenses. Therefore, the kinds of lamps employed as well as their brilliance rating is extremely important for situations involving vehicle safety and the like.

Therefore, a long standing need has existed to provide a novel brake lighting system which employs a switch which is relatively enclosed and which incorporates a moving mounting so as to permit closure of switch contacts without interference from debris or other foreign matter. Also, it is important that super brilliant lamps be included in the electrical circuit to maximize optical visibility when energized.

SUMMARY OF THE INVENTION

Accordingly, the above problems and difficulties are obviated by the present invention which provides a novel brake lighting system which includes at least a pair of super brilliant diode lamps connected in parallel with a vehicle running light. The diode lamps are coupled to a bellows switch having a pair of contacts carried by contact members which are respectively fixed to supporting structure and free-floating so that contact closure occurs upon collapse of the bellows. In one form of the invention, one of the contact members is fixedly attached to a movable structure, such as a brake cable, while the other contact closure is freely carried on the cable. A fixed stop is placed in the path of bellows switch movement so that upon movement of the cable, the floating contact member portion of the bellows switch butts thereagainst to cease movement, while the contact member secured to the cable moves into its closure position therewith.

Therefore, it is a major object of the present invention to provide a novel vehicle optical safety apparatus having a bellows switch incorporated into the electronic system whereby collapsing of the bellows initiates energization of the electrical circuit.

Another object of the present invention is to provide a novel vehicular braking system incorporating an optical visual display employing super brilliant diodes indicating a braking procedure of the vehicle and which incorporates an enclosed switch mechanism having a deformable or collapsible housing.

Still another object of the present invention is to provide a novel electrical switch for use in a braking system whereby super brilliant diode lamps are ignited upon contact closure effected by the deformation or collapsing of a switch housing in response to foot pedal or hand brake actuation.

Another object of the present invention is to provide a novel brake lighting system for vehicles incorporating a novel switch of a bellows type carried on a movable cable and including a stop means abutting with the switch means to collapse the bellows for effecting contact closure and energization of super brilliant diode lamps.

Yet another object of the present invention is to provide a novel electronic circuit and means therefor for use in a vehicular braking system which greatly reduces costs by using solid state technology having super brilliant diodes incorporated into the circuit in cooperation with flexible circuit contacts and printed circuit boards.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
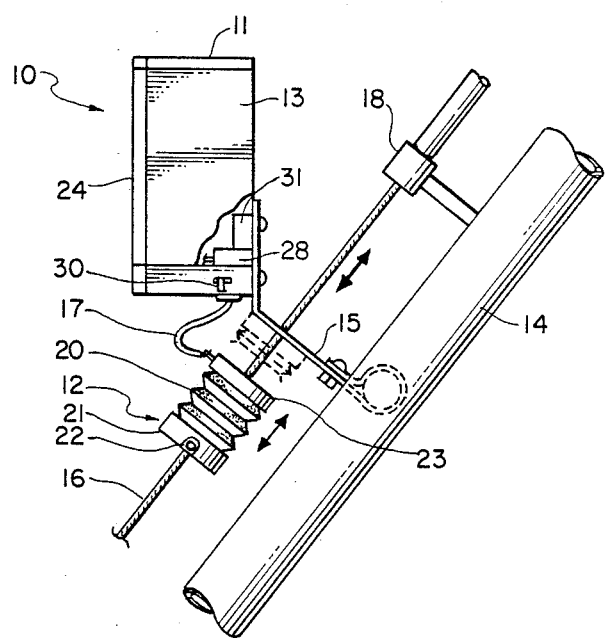
FIG. 1 is a side elevational view of the novel vehicular lighting system of the present invention incorporating a novel bellows-type switch.

Referring to FIG. 1, a multi-purpose safety apparatus is indicated in the general direction of arrow 10 which incorporates the present invention and includes a tri-functional lamp 11 and an electromechanical brake switch 12. The lamp 11 includes a housing 13 anchored to a vehicle frame 14 by a bracket 15. The brake switch 12 is carried on a rectilinear movable cable 16 and is electrically connected to the lamps of the tri-functional lamp 11 by means of conducting wires 17. A cable guide 18 is fixedly secured to the vehicle frame 14 and supports the brake cable 16.

It can be seen that the brake switch 12 is off a bellows type and includes a collapsible bellows 20 attached at one end to a contact member 21 secured to cable 16 by means of a set screw 22. The opposite end of bellows 20 is secured to a floating contact member 23 which is adapted to butt or bear against the opposing surface of bracket 15 serving as a stop means when the cable is moved in the direction of guide 18. Therefore, the distance between the contact member 21 and contact member 23 is greatly reduced upon the collapsing of bellows 20 when the cable is moved so that the floating member 23 stops while additional movement of the cable urges contact member 21 further towards the floating member 23. To be described later, the contact members carry contact closures so that when brought together, a circuit is energized to ignite the braking lights.

Figure 2:
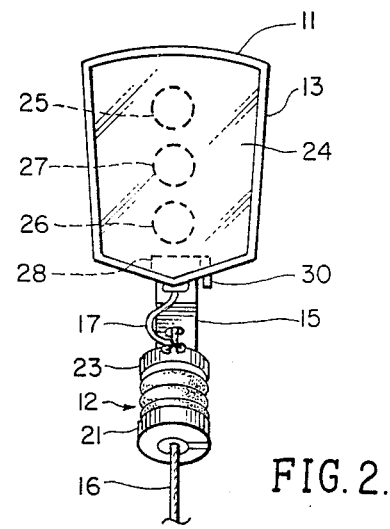
FIG. 2 is a rear elevational view of the vehicular lighting system showing the optical display of lit lamps carried on the housing.

Referring now to FIG. 2, it can be seen that the tri-functional lamp 11 is carried on the end of bracket 15 and includes a reflective lens 24 which encloses a pair of brake lights 25 and 26, as well as a continuously running light 27. It is to be understood that the brake lights 25 and 26 are of a super brilliant diode type, while the running lamp 27 may be of a conventional filament type bulb. The reflector or lens 24 may be composed of an acrylic and may be colored red.

In FIGS. 1 and 2, it can further be seen that a safety lightswitch 28 is mounted on the bottom of the housing 13 and is electrically connected to the center running light 27, and further includes a mechanical toggle 30 protruding through the housing 13. When physically actuated by a vehicle operator, the toggle 30 actuates the switch 28 to electrically close and, in this manner, an electrical current is supplied to the running light 27.

Figure 3:
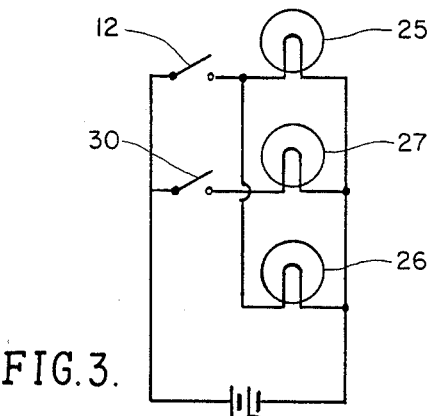
FIG. 3 is a schematic view of an electrical circuit for energizing the super brilliant lamps and the running lamp employed in the lighting system shown in FIGS. 1 and 2.

In FIG. 3, an electrical circuit is illustrated in which the switch 30 is shown in series with the running lamp 27 and switch 12 is shown in parallel with diode lamps 25 and 26. The circuit includes a battery supply 31 which is carried in the housing 13 by suitable brackets or snap clamps.

Figure 4:
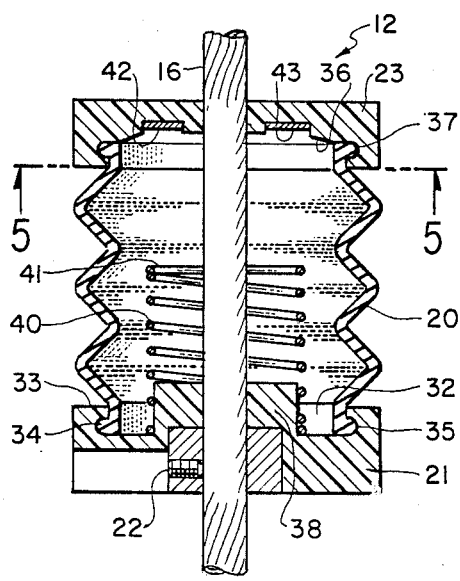
FIG. 4 is an enlarged longitudinal cross-sectional view of the novel bellows switch used in the electronic circuit shown in FIG. 3.

Referring now in detail to FIG. 4, the bellows switch 12 is more clearly illustrated in which contact member 21 is secured to the cable 16 by means of set screw 22. The contact member 21 includes a recess 32 defined by an annular shoulder 33 having an undercut 34 into which a beaded end of the bellows 20 is disposed and retained. The beaded end is indicated by numeral 35. The opposite end of bellows 20 is similarly retained within a recess 36 on closure member 23 by an annular bead 37. The central or midsection of the bellows 20 includes a plurality of convolutions permitting collapse of the bellows as the respective closure members are drawn together.

Closure member 21 further includes a central boss 38 that is employed to support one end of a helical spring 40. The helical spring 40 terminates in a flat contact closure, indicated by numeral 41 at the extreme end of the last helical coil of the spring.

Contact member 23 includes a pair of spaced-apart contact members 42 and 43 which are coaxially disposed with respect to the cable 16 and with respect to the helical spring 40. Therefore, when the bellows 20 collapses, the contact closure 41 will bear against the contacts 42 and 43 to complete the electrical circuit shown in FIG. 3 so that the super brilliant diode lamps 25 and 26 will be ignited. Collapsing occurs when the cable 16 is moved to the point where the closure member 23 bears against the bracket or stop 15. At this time, further movement of the cable 16 causes the closure member 21 to proceed to where the contact closure 41 will mate with the contacts 42 and 43.

It is to be understood that the contacts 42 and 43 may be composed of flex circuit construction employing modern technological construction techniques.

Figure 5:
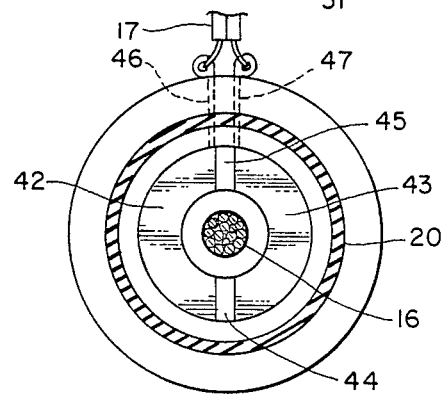
FIG. 5 is a transverse cross-sectional view of the bellows switch shown in FIG. 4 as taken in the direction of arrows 5—5 thereof.

As shown in FIG. 5, the contact closures 42 and 43 are semicircular and their opposite ends are in fixed spaced-apart relationship and separated by insulation 44 and 45. Leads 46 and 47 connect the respective contact closures with the wires in the cable 17.

Therefore, in view of the foregoing, it can be seen that the novel vehicle braking system light of the present invention provides a novel and relatively inexpensive means for improving the safety of a braking light system. Movement of the cable 16 by any means which includes foot pedal or hand lever operation will cause the closure of the respective contacts for energization of the brake lights 25 and 26.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A vehicular safety light apparatus comprising:
   fixed structure supported on a vehicle frame;
   braking mechanism in the construction of a cable movably related with respect to said fixed structure;
   lighting means disposed in a housing mounted on said fixed structure;
   cylindrical switch means carried on said braking mechanism cable and movable therewith responsive to engagement with said fixed structure to energize said lighting means;
   said switch means includes a circular base secured to said braking mechanism cable and a circular member movably mounted about said braking mechanism cable in spaced relationship to said base;
   a deformable element interconnecting said base with said member and coaxially disposed therewith;
   a pair of coaxial closure contacts secured to said movable member and to said fixed structure base respectively;
   said closure contact carried on said movable member in alignment for electrical coupling with said closure contact on said fixed base;
   said closure contact on said member releasably engageable with said closure contact on said base to establish an electrical circuit in response to deformation of said deformable element;

said closure contact carried on said base is a coil spring coaxially disposed with respect to said cable;

said deformable element comprising a convoluted bellows having its opposite ends secured to said base and said member respectively;

said cable adapted to slide through said member to effect engagement of said closure contact spring with said member closure contact;

one closure contact of said pair is a pair of semicircular contacts coaxially disposed on said member about said cable with insulation disposed between opposite opposing ends of said semicircular contact pairs and said closure contact on said base is said coil spring having one end secured to said base with its opposite end projecting coaxially about said movable cable to terminate in a closure element selectively engageable with said pair of semicircular contacts to energize said lighting means.

2. The invention as defined in claim 1 wherein:

said deformable element is a collapsible bellows coaxial with said cable having its opposite ends secured to said base and member respectively.

* * * * *